(12) United States Patent
Mages

(10) Patent No.: US 7,570,839 B1
(45) Date of Patent: Aug. 4, 2009

(54) TOOL RANGE SELECTION

(75) Inventor: Michael Mages, Oakland, CA (US)

(73) Assignee: Apple Inc., Cupertino, CA (US)

( * ) Notice: Subject to any disclaimer, the term of this patent is extended or adjusted under 35 U.S.C. 154(b) by 623 days.

(21) Appl. No.: 11/153,934

(22) Filed: Jun. 15, 2005

(51) Int. Cl.
*G06T 3/00* (2006.01)

(52) U.S. Cl. .................. 382/276; 345/619; 345/650

(58) Field of Classification Search ............. 382/276, 382/289–290, 294, 296–297, 309–311; 345/619, 345/650, 661, 676; 715/732
See application file for complete search history.

(56) References Cited

U.S. PATENT DOCUMENTS

| | | | |
|---|---|---|---|
| 6,097,389 A * | 8/2000 | Morris et al. ............. | 715/804 |
| 6,282,330 B1 * | 8/2001 | Yokota et al. ............ | 382/309 |
| 6,301,586 B1 * | 10/2001 | Yang et al. .............. | 707/104.1 |
| 6,437,811 B1 * | 8/2002 | Battles et al. ............ | 715/835 |
| 6,883,140 B1 * | 4/2005 | Acker et al. ............. | 715/730 |
| 2003/0105795 A1 * | 6/2003 | Anderson et al. ........ | 709/101 |
| 2006/0087519 A1 * | 4/2006 | Berger et al. ............ | 345/619 |
| 2006/0285868 A1 * | 12/2006 | Holmes .................. | 399/81 |

FOREIGN PATENT DOCUMENTS

| | | | |
|---|---|---|---|
| WO | WO 96/29675 | * | 9/1996 |
| WO | WO 99/06953 | * | 2/1999 |

OTHER PUBLICATIONS

Lennox et al. "Adobe Photoshop 5.0 Certification Guide", Adobe Press, 1999, pp. 112-136; 211-214.*

* cited by examiner

*Primary Examiner*—Andrew W Johns
(74) *Attorney, Agent, or Firm*—Hickman Palermo Truong & Becker LLP; Eric L. Sutton

(57) ABSTRACT

Operations on a sequence of digital images can be performed by causing an operation associated with the currently-active tool to be performed on each digital image that corresponds to a representation in a user-selected range of digital images. The operation is performed in response to the user input selecting the range.

30 Claims, 5 Drawing Sheets

TOOL RANGE SELECTION

FIELD OF THE INVENTION

The present invention relates to manipulating digital images, and more specifically, applying an operation to a sequence of digital images.

BACKGROUND

There exist many computer programs today that assist a user in viewing and editing digital images on a computer. For example, an image editing program enables a user to select an image from a group of images, often by selecting a smaller, or "thumbnail," representative of the image. After selecting the image, operations may be performed on the image to alter its appearance or orientation, for example.

For example, a user could select an image (or a thumbnail representation thereof) by clicking on the image or its thumbnail representation with a pointer, and then select a "rotate" tool from a palette of tools or from a drop-down menu. As a result, the "rotate" operation would be performed on the selected image.

Another user interactive technique of performing operations on a digital image involves selecting a tool, and then clicking on a digital image upon which the operation represented by the tool is to be performed. As a result, the operation is performed upon the image. Frequently, the cursor changes in appearance to alert the user that when the mouse button is clicked, the subject that is clicked upon will be operated upon instead of merely selected. For example, a user could select a "rotate" tool from a palette of tools or from a drop-down menu. The cursor could change in appearance from a pointer to an arc with an arrow on one end, which is a common icon for a "rotate" command. The user would then click on an image with the rotate tool, and then rotate the image freely by holding down a mouse button or key modifier. Alternatively, the rotate tool could be configured to rotate the operated-upon image a predefined amount, such as ninety degrees clockwise.

However, there are many drawbacks to current methods of performing operations on a digital image. By selecting an image and then selecting a tool, or vice versa, a user must click twice, often in different areas of the screen. This is a waste of time and effort. Often a user must select an image, select a tool, and then click on the image again to perform an operation.

Furthermore, current methods only perform operations on single images. Users today may have large numbers of digital images to work with, and desire to perform an operation on several images at once. The previous approaches require the user to select and operate on each image individually. It becomes extremely tedious for a user to rotate 200 images from a horizontal to vertical perspective, or convert 200 images from color to black-and-white. Therefore, there exists a need for techniques to perform an operation on a plurality of digital images simultaneously and concurrent with selecting the images or the thumbnail representations thereof.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
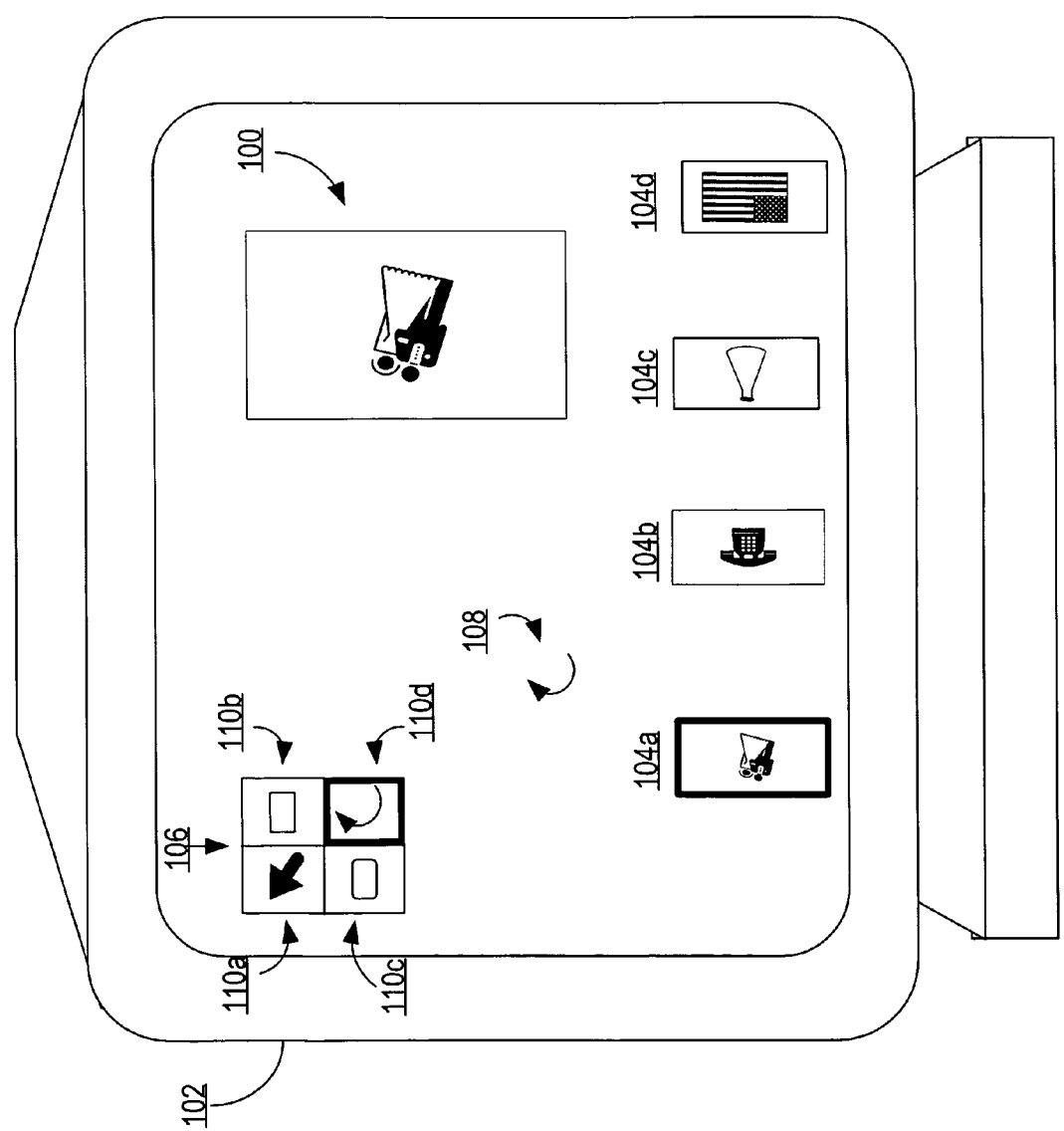
FIG. 1 is a block diagram illustrating a screen displaying a digital image selected from a group of thumbnail representations.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In one embodiment, a user is presented with a number of "thumbnails," or small representations of a larger image, at the bottom of the screen. In response to a user's selection of one thumbnail image, the larger digital image represented by the thumbnail is displayed for the user to view, edit or otherwise manipulate.

Techniques described herein perform an operation on a range of digital images. For the purpose of illustration, an embodiment shall be described in which the image manipulation is "rotate ninety degrees clockwise," and the tool representing the "rotate" manipulation is a small arc with an arrowhead on one end. However, the tool range selection is not limited to any particular type of image manipulation or tool. The following description of an embodiment of the invention in a particular tool context is not to be construed as a limitation on the invention.

In one embodiment, a user is presented with a series of representations of digital images, or thumbnails. The series includes a range of misaligned images that are oriented horizontally instead of with their proper vertical orientation. The remaining thumbnails are correctly oriented and need no adjustment.

According to one embodiment, the rotate tool is selected by a user and becomes the currently-active tool. This first user input is commonly done by clicking on a graphical icon representing the operation to be performed. For example, in response to a user clicking on an icon comprising a small arc with an arrowhead on one end, the "rotate ninety degrees clockwise" operation would be activated, in which an image is rotated ninety degrees clockwise each time the operation is performed on an image or its thumbnail.

With the tool now selected, the first thumbnail in the range of misaligned images is clicked, or selected. This establishes the first boundary of the range and rotates both the thumbnail clicked on and the image represented thereby.

With the first boundary now established, a modifier key is pressed and held, comprising an intermediate input. The modifier may be the "shift" key or any other key configured for the purpose. In other embodiments of the invention, no modifier key is required, or the modifier key may be activated at a different point in the sequence. Alternatively, the modifier could be a mouse click, verbal command pursuant to voice recognition, or any other activity.

Keeping the modifier key depressed, the final thumbnail in the range of misaligned images is clicked, or otherwise selected. This establishes the end of the range, and in response, the rotate operation is performed on all thumbnails, and the images they represent, between the first boundary and the end of the range or sequence, not including the already-rotated first boundary image. This act of selection is the second user input.

For example, there are 10 thumbnail images displayed. If a user wishes to rotate images 3-6, the user would select the rotate tool, click on thumbnail #3 (thereby rotating thumbnail #3), depress and hold a modifier key such as "shift," and then click on thumbnail #6 with the modifier key still depressed. As a result, thumbnails 4-6 and their corresponding images would be rotated ninety degrees clockwise. All other thumbnails and their corresponding images would remain unchanged. In another embodiment, thumbnail 3 and its corresponding image would not be rotated when the user clicked on it to begin the range, and thumbnails 3-6 and their corresponding images would be rotated when the user clicked on thumbnail 6 to end the range. Other embodiments are envisioned where thumbnails and their corresponding images rotate at the same and different times.

Therefore, one embodiment of the invention allows a user to select a range of digital images and perform an action in the same step, eliminating the need to rotate each image in the range individually. The embodiment also eliminates a need to select a range and then select an operation to be performed on that range. Because the range selection is contextually related to the tool, the operation happens in one step instead of multiple steps.

In another embodiment, if a modifier key is depressed at the time a thumbnail is selected, then the selection establishes a new first boundary of a range and does not rotate both the selected thumbnail and its corresponding image.

For example, there are 10 thumbnail images displayed. If a user wishes to rotate images 3 and 5-7, the user could select the rotate tool and click on thumbnail #3. As a result, thumbnail 3 and its corresponding image will be rotated ninety degrees clockwise. All other thumbnails and their corresponding images will remain unchanged. The user would then click on thumbnail 5. Thumbnail 3 is de-selected, thumbnail 5 and its corresponding image would be selected and rotated, and the first boundary established. The user would then depress a modifier key and click on thumbnail #7 with the modifier key still depressed. As a result, thumbnails 6 through 7 and their corresponding images would be rotated. All other thumbnails and their corresponding images would remain unchanged. Therefore, this embodiment allows for the noncontiguous selection and rotation of images. Other embodiments are envisioned wherein noncontiguous selection and operation are performed.

In some embodiments, the selected thumbnail will be highlighted in a way to indicate its status as the currently-selected item. Further, in some embodiments, the thumbnail will not be rotated or otherwise acted upon in a manner consistent with the operation being applied to the digital image it represents.

In an alternative embodiment of the invention, modifier keys are not needed. Further, other embodiments exist wherein additional modifiers may be applied to the operation to change its nature in some way. For example, an "option" key may be depressed to change the direction of rotation from that which is applied by the rotate tool under normal circumstances.

In an alternative embodiment of the invention, the tool image will change to reflect the impending operation. For example, the "rotate" tool image would be a clockwise arc when the tool is enabled to rotate images in a clockwise direction, and the "rotate" tool image would be a counterclockwise arc when the tool is enabled to rotate images in a counterclockwise direction.

In other embodiments of the invention, different operations may be performed on a range of digital images. For example, the range of images could be transformed from color to black and white, or the images could be straightened.

Referring to FIG. 1, it illustrates a digital image 100 that is displayed on a display screen 102. Thumbnails 104a-104d are displayed at the bottom of the display screen 102. One thumbnail 104a represents the currently-displayed image 100. A tool palette 106 is displayed in the upper left of the display screen 102. Through use of a cursor tool 110a, a user may select any of the thumbnails 104a-104c for display or one of the tools 110a-110d on the tool palette 106. FIG. 1 illustrates the far left thumbnail 104a being selected, the selection status being represented with a bold outline. The image 100 displayed is the image represented by the selected thumbnail 104a. The currently-active tool is the rotate tool 110d, and the cursor 108 takes a form to indicate visually the currently-selected tool.

Figure 2:
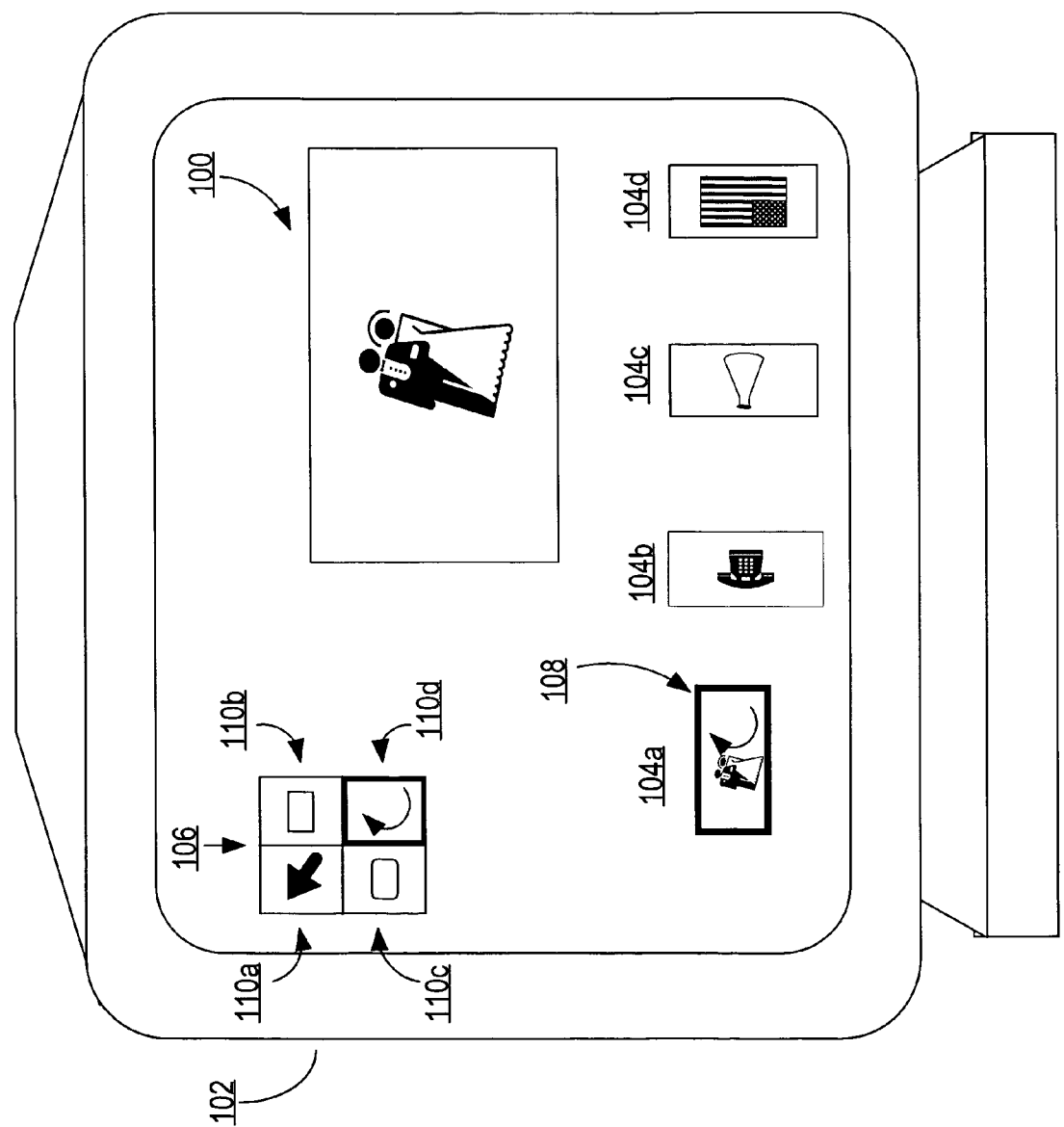
FIG. 2 is a block diagram illustrating a screen displaying a digital image having been operated on by a tool.

Referring to FIG. 2, a user has clicked on the leftmost thumbnail 104a with the rotate tool 110d selected. This is shown by the cursor 108 representing the rotate tool 110d and being within the perimeter of the thumbnail 104a. As a result, both the selected thumbnail 104a and the corresponding digital image 100 have been rotated ninety degrees clockwise while the remaining thumbnails 104b-104d remain unchanged. This illustrates the operation of a tool on a single item.

Figure 3:
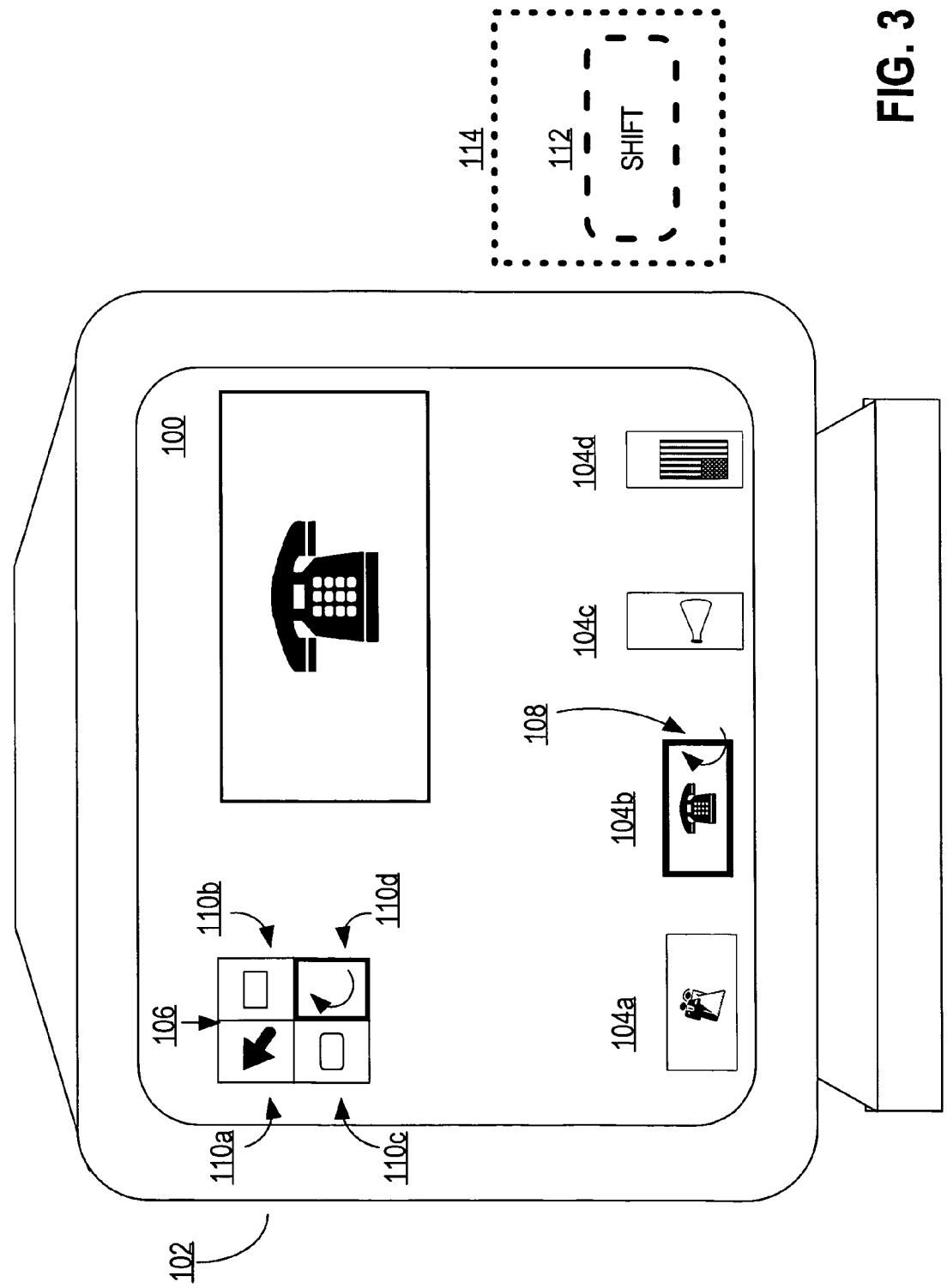
FIG. 3 is a block diagram illustrating a screen displaying the selection of a first image upon which an operation will be performed.

Referring now to FIG. 3, a user has depressed a modifier key 112 located on an input device 114. While continuing to depress the modifier key 112, a user clicks on the second thumbnail 104b. As a result, the selected thumbnail 104b and the corresponding digital image 100 have been rotated ninety degrees clockwise. Further, the first boundary for the range has been set. The corresponding digital image 100 now reflects the selected thumbnail 104b.

Figure 4:
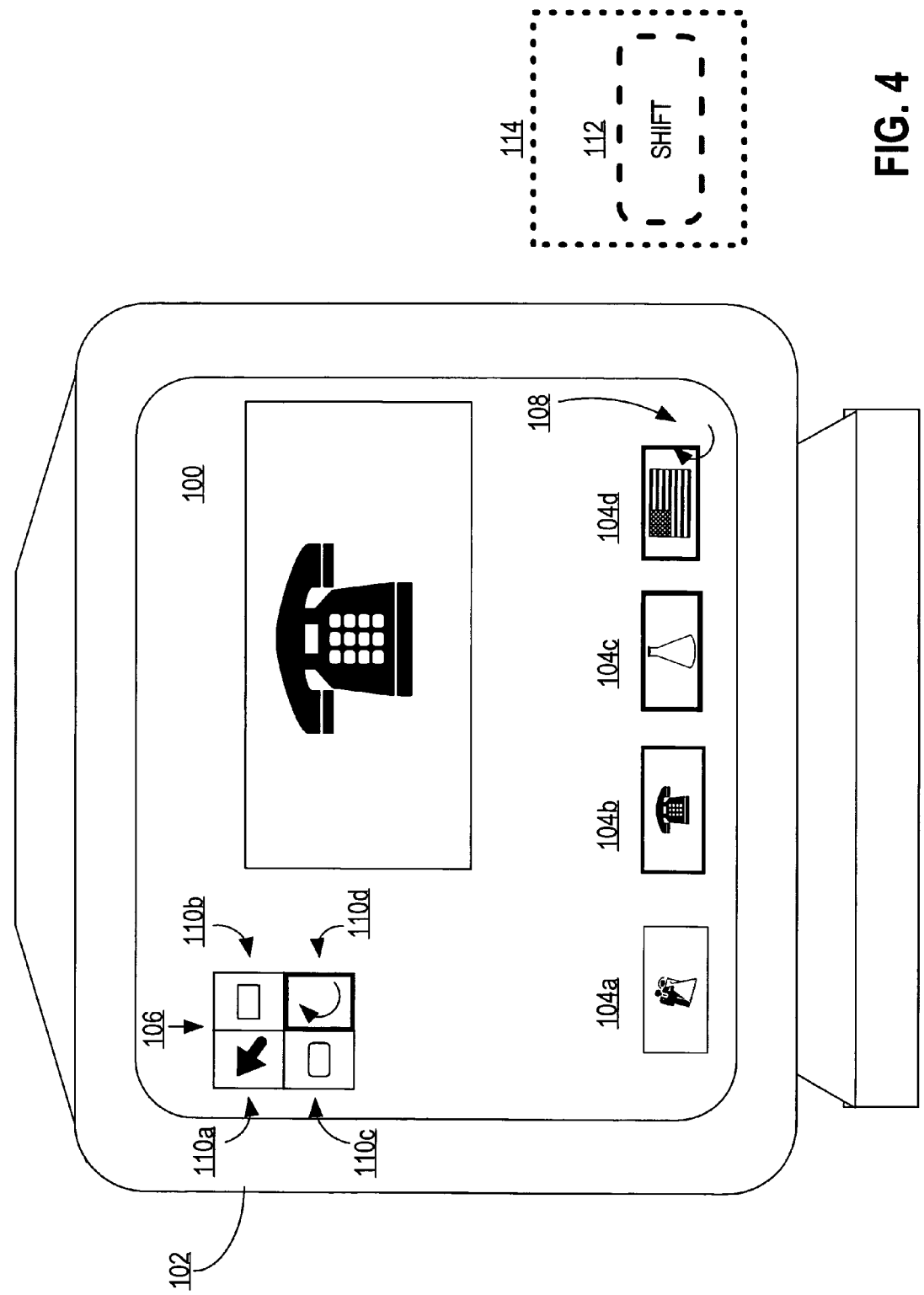
FIG. 4 is a block diagram illustrating a screen displaying the result of an operation being performed on a sequence of digital images.

Referring now to FIG. 4, a user has continued to hold down the modifier key 112 and has clicked on the rightmost thumbnail 104d. This sets the end of the boundary and performs the rotate function on the range of thumbnails between the first boundary point and the end of the boundary. As a result, the range of thumbnails 104b-d from the initial boundary to the end and their corresponding digital images has been rotated ninety degrees clockwise.

Hardware Overview

Figure 5:
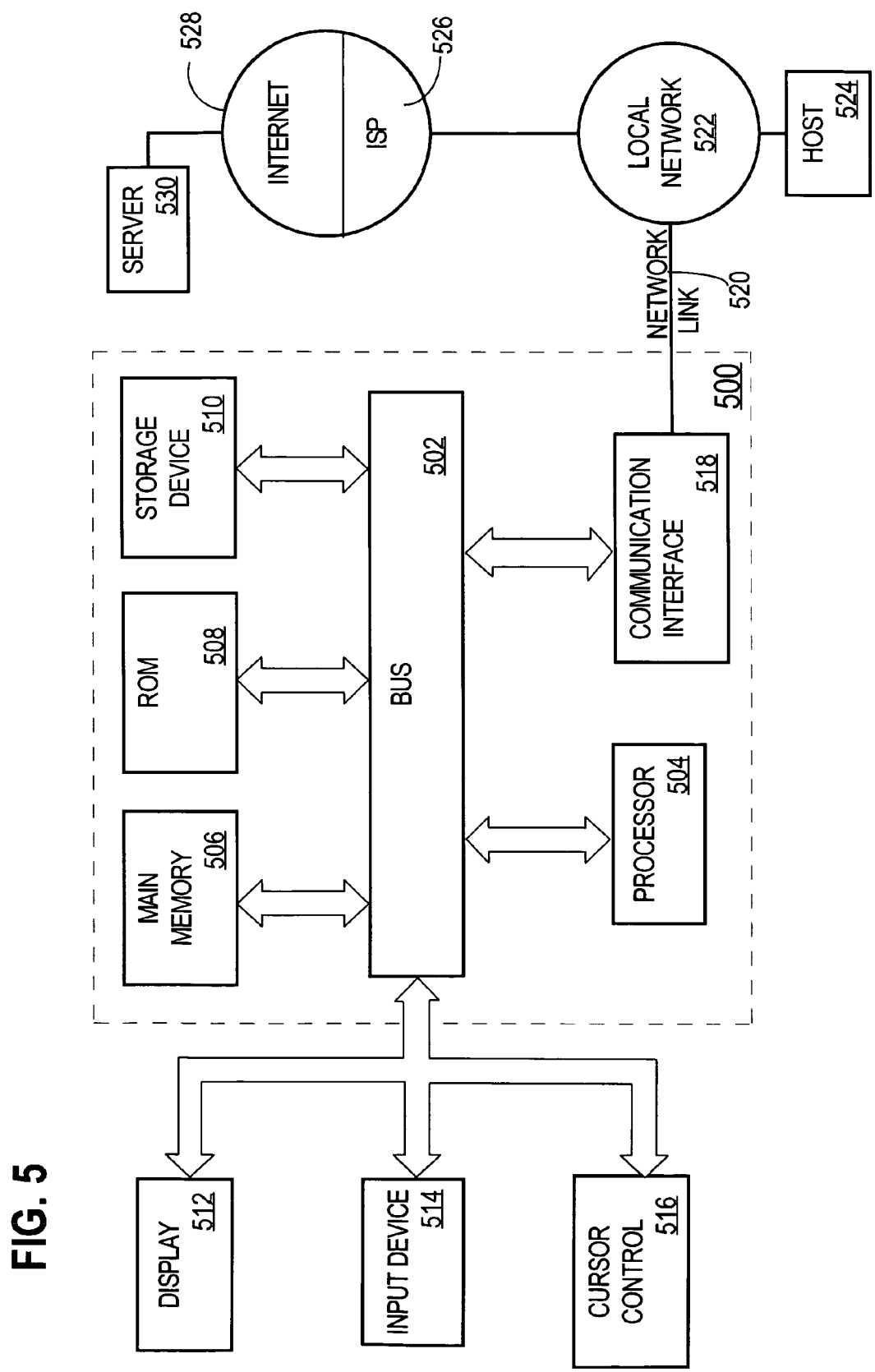
FIG. 5 is a block diagram illustrating a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method for performing operations on digital images, the method comprising:

displaying a series of representations of digital images;

receiving first user input that establishes a particular tool as a currently-active tool that is applied as representations of digital images are selected;

after receiving the first user input, receiving a second user input that selects one or more representations in said series; and without requiring any user input beyond said second user input, and in response to the second user input, causing an operation associated with the currently-active tool to be performed on each digital image that corresponds to a representation of said one or more representations.

2. The method of claim 1, wherein said one or more representations, is a range of representations.

3. A computer-readable storage medium storing one or more sequences of instructions which, when executed by one or more processors, causes the one or more processors to perform the method recited in claim 2.

4. The method of claim 1, wherein said operation rotates said one or more representations and said each digital image that corresponds to said one or more representations.

5. A computer-readable storage medium storing one or more sequences of instructions which, when executed by one or more processors, causes the one or more processors to perform the method recited in claim 4.

6. The method of claim 1, wherein said operation changes at least one color of said one or more representations and said each digital image that corresponds to said one or more representations.

7. A computer-readable storage medium storing one or more sequences of instructions which, when executed by one or more processors, causes the one or more processors to perform the method recited in claim 6.

8. The method of claim 1, wherein said operation straightens said one or more representations and said digital image that corresponds to said one or more representations.

9. A computer-readable storage medium storing one or more sequences of instructions which, when executed by one or more processors, causes the one or more processors to perform the method recited in claim 8.

10. The method of claim 1, wherein said operation comprises a type of operation that can performed on a single digital image.

11. A computer-readable storage medium storing one or more sequences of instructions which, when executed by one or more processors, causes the one or more processors to perform the method recited in claim 10.

12. The method of claim 1, wherein said second user input comprises a preliminary input.

13. The method of claim 12, wherein said preliminary input comprises input from a keyboard.

14. A computer-readable storage medium storing one or more sequences of instructions which, when executed by one or more processors, causes the one or more processors to perform the method recited in claim 13.

15. The method of claim 12, wherein said preliminary input comprises input from a pointing device.

16. A computer-readable storage medium storing one or more sequences of instructions which, when executed by one or more processors, causes the one or more processors to perform the method recited in claim 15.

17. A computer-readable storage medium storing one or more sequences of instructions which, when executed by one or more processors, causes the one or more processors to perform the method recited in claim 12.

18. The method of claim 1, further comprising, before receiving said second user input, receiving a third user input altering one or more properties of said operation associated with the currently-active tool to be performed on each digital image.

19. A computer-readable storage medium storing one or more sequences of instructions which, when executed by one or more processors, causes the one or more processors to perform the method recited in claim 18.

20. The method of claim 1, wherein said one or more representations includes a first series of one or more representations and a second series of one or more representations, said first series and said second series being noncontiguous.

21. A computer-readable storage medium storing one or more sequences of instructions which, when executed by one or more processors, causes the one or more processors to perform the method recited in claim 20.

22. The method of claim 1, further comprising displaying a visual indication of the selection of the one or more representations.

23. A computer-readable storage medium storing one or more sequences of instructions which, when executed by one or more processors, causes the one or more processors to perform the method recited in claim 22.

24. A computer-readable storage medium storing one or more sequences of instructions which, when executed by one or more processors, causes the one or more processors to perform the method recited in claim 1.

25. The method of claim 1, wherein a cursor takes a form associated with the particular tool when the particular tool is established as the currently active tool.

26. A computer-readable storage medium storing one or more sequences of instructions which, when executed by one or more processors, causes the one or more processors to perform the method recited in claim 25.

27. The method of claim 1, further comprising:
after causing said operation associated with the currently-active tool to be performed on said each digital image that corresponds to the representation of said one or more representations, receiving a third user input that selects at least one other representation;
without requiring any user input beyond said third user input, and in response to said third user input, causing the operation associated with the currently-active tool to be performed on each digital image that corresponds to the at least one other representation.

28. A computer-readable storage medium storing one or more sequences of instructions which, when executed by one or more processors, causes the one or more processors to perform the method recited in claim 27.

29. A computer-implemented method for performing operations on digital images, the method comprising:
displaying a series of representations of digital images;
receiving a first user input that establishes a particular tool as a currently-active tool;
after receiving the first user input, receiving a second user input that selects a plurality of said representations, thereby establishing a range of digital images; and
without requiring any user input beyond said second user input, causing an operation associated with the currently-active tool to be performed on each digital image that corresponds to a representation in said plurality of representations, said operation comprising an operation that could be performed on a single digital image.

30. A computer-readable storage medium storing one or more sequences of instructions which, when executed by one or more processors, causes the one or more processors to perform the method recited in claim 29.

* * * * *